Feb. 26, 1957  D. ADAMS ET AL  2,782,552
LIVE BAIT PAIL
Filed March 7, 1955
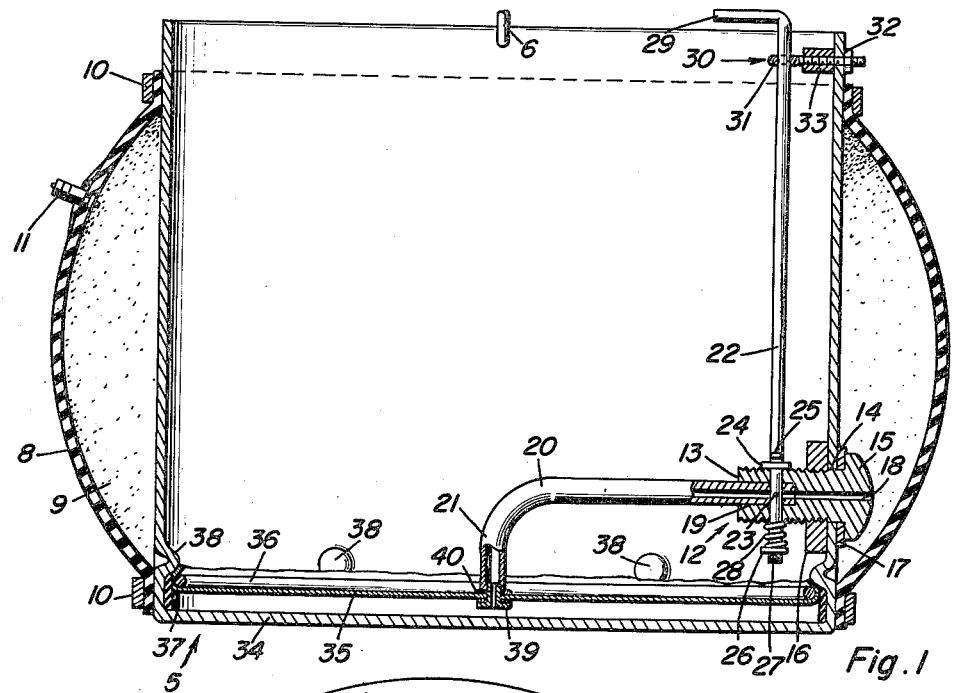
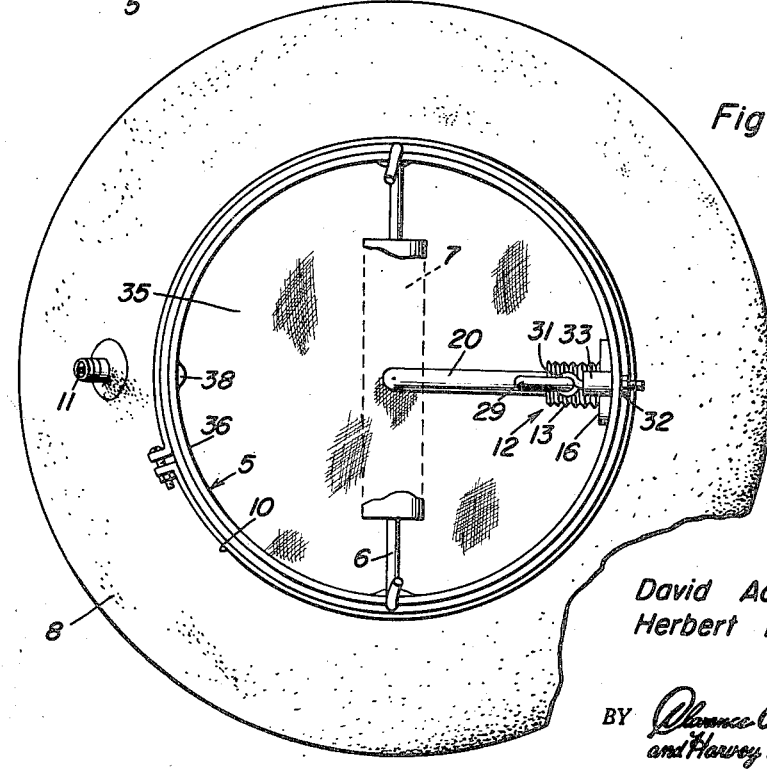
David Adams
Herbert Moss
INVENTORS,

United States Patent Office 2,782,552
Patented Feb. 26, 1957

2,782,552
LIVE BAIT PAIL

David Adams, Roseville, and Herbert Moss, Detroit, Mich.

Application March 7, 1955, Serial No. 492,377

8 Claims. (Cl. 43—57)

The present invention relates to new and useful improvements in live bait pails for use particularly by fishermen and has for its primary object to provide, in a manner as hereinafter set forth, a device of this character comprising novel means for aerating the water, thereby prolonging the life of the minnows or other bait by many hours.

Another very important object of the invention is to provide a live bait pail of the aforementioned character comprising unique means for discharging a continuous supply of air into the water and which, further, includes means for accurately regulating or controlling the air as desired.

Other objects of the invention are to provide a live bait pail of the character set forth which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a view in vertical section through a live bait pail constructed in accordance with the present invention.

Figure 2 is a top plan view of the device.

Referring now to the drawing in detail, it will be seen that the embodiment of the invention which has been illustrated comprises a substantially cylindrical bucket 5 of suitable material and capacity. Of course, the bucket is for the reception of water and minnows or other bait. The bucket 5 is provided with a suitable bail 6 having mounted thereon a handle or grip 7.

Encircling the bucket 5 is a tubular jacket or sleeve 8 of rubber or other suitable resilient material providing an air chamber 9. Bands 10 clamp the end portions of the jacket 8 around the bucket 5 in a manner to prevent leakage. The jacket 8 is provided with a suitable inflating valve 11.

Air under pressure from the chamber 9 enters the lower portion of the bucket 5 through means comprising a regulating valve 12. The valve 12 comprises an elongated body in the form of a threaded bolt 13 which passes through an opening 14 provided therefor in the lower portion of the wall of the bucket 5 and is provided on its outer end with a rounded, smooth head 15. A nut 16 is threaded on the body 13 and engaged with the interior of the bucket 5 for securing the valve 12 firmly in position. A gasket 17 beneath the head 15 prevents leakage around the bolt 13. The bolt 13 includes a longitudinal bore or air passage 18 comprising a counterbored inner end portion 19 for the reception of one end portion of a discharge tube 20, said tube having a downturned end portion 21.

The valve 12 still further includes a vertical stem 22 which is journalled in the bolt 13 and which traverses the tube 20. A port 23 is provided in the rotary stem 22 for communication with the tube 20 and the passage 18. A washer 24 is provided on the stem 22 above the bolt 13. A cotter pin 25 is mounted in the stem 22 above the washer 24. Mounted on the stem 22 below the bolt 13 is a washer 26 which is secured by a cotter pin 27. A coil spring 28 is mounted between the washer 26 and the bolt 13 for yieldingly resisting upward movement of the stem 22.

The stem 22 extends upwardly to a point adjacent the top of the bucket 5 and terminates in an angularly bent operating handle 29. The upper end portion of the stem 22 is journalled in a bearing 30 comprising an eye-bolt 31 mounted in the bucket 5. A nut 32 secures the eye-bolt 31 on the bucket 5. A spacing sleeve 33 is provided on the bolt 31 between the eye thereof and the bucket 5.

Mounted in the lower portion of the bucket 5 in spaced relation to the bottom 34 thereof is a porous or foraminous air distributing baffle 35 of suitable flexible material. The marginal portion of the baffle 35 is secured by a resilient wire ring 36 to the bucket 5 with a sealing ring 37 of rubber or other suitable material therebetween. The resilient wire ring 36 is snapped beneath retaining lugs 38 which are provided therefor in the bucket 5 immediately above the sealing ring 37. The downturned end portion 22 of the tube 21 is connected to the baffle 35 for communication with the bucket 5 below said baffle through a flanged tubular rivet 39. The tubular rivet 39 is inserted through the baffle 35 and engaged in the tube 21. A washer 40 is provided between the baffle 35 and the tube 21.

It is thought that the operation of the device will be readily apparent from a consideration of the foregoing. Briefly, the collapsible resilient jacket 8 is inflated with air under pressure from a suitable source of supply through the valve 11. Of course, the bucket 5 is filled to the desired level with water and the minnows or other bait are placed therein. Through the medium of the operating handle 29, the valve 12 is then opened to the desired adjustment for permitting air under pressure from the chamber 9 to flow through the passage 18 and the tube 20 into the bucket 5 below the distributing baffle 35 through which it rises in an obvious manner for thoroughly aerating the water. The jacket 8, when inflated or partially so, lends buoyancy to the bucket. When the air is exhausted or substantially exhausted from the chamber 9 and the jacket 8 collapses, said jacket engages the rounded head 15 of the bolt 13 and closes the passage 18 for preventing the escape of the water from the bucket 5 into said chamber.

It is to be understood that changes in the details of construction may be resorted to which will fall within the scope of the invention as claimed.

What is claimed as new is as follows:

1. A live bait pail of the character described comprising: a bucket for the reception of water, a resilient, collapsible inflatable air jacket encircling said bucket, and means for conveying air under pressure from the jacket into the lower portion of the bucket.

2. A live bait pail of the character described comprising: a bucket for the reception of water, a resilient, collapsible inflatable air jacket encircling said bucket, and means for conveying air under pressure from the jacket into the lower portion of the bucket, said means including a regulating valve comprising a body communicating with the interior of the jacket, and a discharge tube in the bucket connected to the outlet side of the valve.

3. A live bait pail of the character described comprising: a bucket for the reception of water, a resilient, collapsible inflatable jacket encircling said bucket, a valve comprising an elongated threaded body extending through the bucket and having an air passage therein communicating with the interior of the jacket for the reception of air under pressure therefrom, a discharge tube in the bucket connected to the body for receiving air therefrom, a manually adjustable stem rotatably mounted in the body for controlling the passage of air therethrough, said stem having a port therein for communication with the air passage and the tube, and means for rotating the stem.

4. A live bait pail of the character described comprising: a bucket for the reception of water, a resilient, collapsible, inflatable jacket encircling the bucket, a bolt extending through the bucket and having an air passage therein communicating with the interior of the jacket and with the bucket, said bolt including a head on its outer end, said jacket being engageable with the head for preventing the escape of water from the bucket into said jacket when said jacket is substantially deflated, and means for controlling the passage of air through the bolt.

5. A live bait pail comprising: a bucket for the reception of water, a foraminous baffle in the lower portion of said bucket, a resilient, collapsible inflatable air jacket encircling said bucket, and means for discharging air under pressure from said jacket into the bucket below the baffle.

6. A live bait pail comprising: a bucket for the reception of water, a foraminous baffle in the lower portion of said bucket, a resilient, collapsible inflatable air jacket encircling said bucket, and means for discharging air under pressure from said jacket into the bucket below the baffle, said means including a tube in the bucket having one end connected to the baffle and communicating therethrough with the bucket, said tube having its other end portion connected to the bucket and communicating therethrough with the jacket.

7. A live bait pail comprising: a bucket for the reception of water, a foraminous baffle in the lower portion of said bucket, a resilient, collapsible inflatable air jacket on said bucket, and means for discharging air under pressure from said jacket into the bucket below the baffle, said means including a tube in the bucket having one end connected to the baffle and communicating therethrough with the bucket, said tube having its other end portion connected to the bucket and communicating therethrough with the jacket, said jacket, when substantially deflated, being engageable with the tube for closing same.

8. A live bait pail comprising: a bucket for the reception of water, a resilient, collapsible inflatable jacket mounted encircling said bucket, and means for injecting air under pressure into the bucket from the jacket, said jacket, when substantially deflated being engageable with and closing said injecting means.

References Cited in the file of this patent

UNITED STATES PATENTS

| | | |
|---|---|---|
| 514,476 | Kersey | Feb. 13, 1894 |
| 647,257 | Gray | Apr. 10, 1900 |
| 1,684,769 | Jackson | Sept. 18, 1928 |
| 1,794,842 | Foster | Mar. 3, 1931 |
| 2,159,718 | Spiner | May 23, 1939 |
| 2,560,672 | Volenec | July 17, 1951 |
| 2,580,879 | Belokin | Jan. 1, 1952 |